United States Patent [19]

Rosman

[11] Patent Number: 4,686,828

[45] Date of Patent: Aug. 18, 1987

[54] HYDRAULICALLY OPERATED CLAMSHELL DEVICE

[75] Inventor: Allan H. Rosman, Woodland Hills, Calif.

[73] Assignee: Dynamic Hydraulic Systems, Inc., Canoga Park, Calif.

[21] Appl. No.: 786,862

[22] Filed: Oct. 11, 1985

Related U.S. Application Data

[63] Continuation-in-part of Ser. No. 633,397, Jul. 23, 1984, which is a continuation-in-part of Ser. No. 601,481, Apr. 18, 1984, which is a continuation-in-part of Ser. No. 570,590, Jan. 13, 1984.

[51] Int. Cl.⁴ .............................................. F16D 31/02
[52] U.S. Cl. .................................... 60/415; 60/478; 60/484; 60/486; 91/189 R; 91/517; 212/250; 294/68.23; 414/726
[58] Field of Search ............ 37/116, DIG. 1, DIG. 7, 37/DIG. 9, DIG. 11, 183 R, 184, 136; 294/68.23, 111; 60/413, 414, 415, 417, 418, 484, 486, 490, 372, 478; 417/217; 414/730, 726; 91/512, 517, 189 R; 212/259, 251, 250

[56] References Cited

U.S. PATENT DOCUMENTS

| | | | |
|---|---|---|---|
| 3,238,722 | 3/1966 | Berkman et al. | 60/416 |
| 3,479,077 | 11/1969 | Martin et al. | 294/68.23 |
| 3,971,215 | 7/1976 | Baron et al. | 60/416 |
| 4,098,377 | 7/1978 | Callaghan | 91/517 |
| 4,161,135 | 7/1979 | Garlinghouse | 91/461 X |
| 4,231,868 | 11/1980 | Lado | 60/484 |
| 4,546,607 | 10/1985 | Kime | 60/372 |

FOREIGN PATENT DOCUMENTS

| | | | |
|---|---|---|---|
| 0606946 | 5/1978 | U.S.S.R. | 37/116 |
| 806585 | 2/1981 | U.S.S.R. | 294/68.23 |

Primary Examiner—Edward K. Look
Attorney, Agent, or Firm—Hopgood, Calimafde, Kalil, Blaustein & Judlowe

[57] ABSTRACT

The invention contemplates a hydraulically operated twin-cable suspension for a clamshell or the like load-handling device. In a preferred embodiment, a charged accumulator is effectively a counterweight and is the source of all hydraulic fluid needed for the full range of actuation of two traction cylinders, one for each of the respective cables. Two power integrators are employed: one is interposed between the accumulator and one of the traction cylinders, and the other is interposed between the accumulator and the other traction cylinder; hydraulic control interconnections between the respective integrator circuits enable load sharing by both cables and simplified single-lever control of plural clamshell functions, including (a) an automated closing dig into loadable material and (b) a quick opening for load discharge.

7 Claims, 1 Drawing Figure

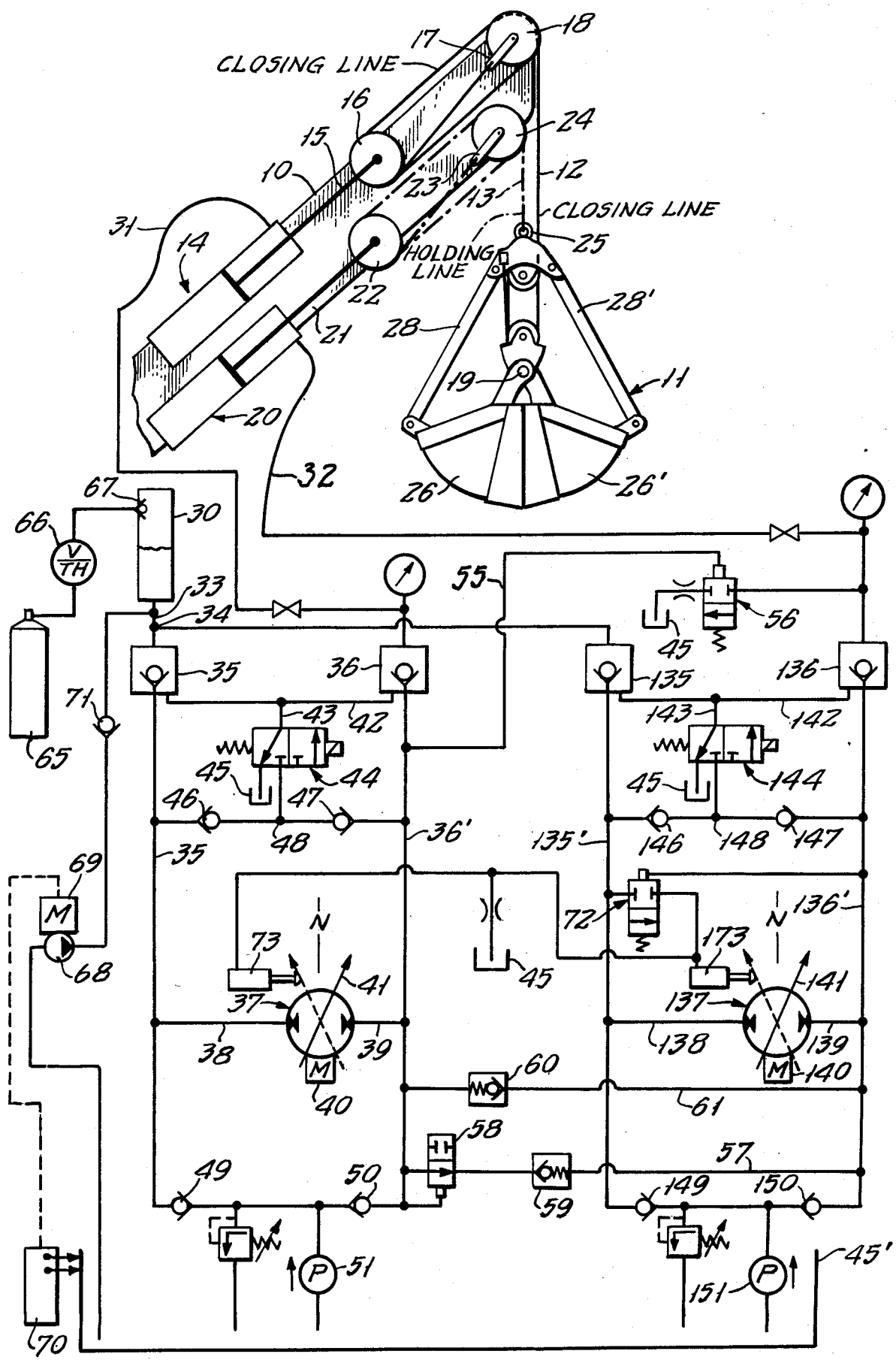

HYDRAULICALLY OPERATED CLAMSHELL DEVICE

RELATED CASES

This application is a continuation-in-part of application Ser. No. 633,397, filed July 23, 1984, which in turn is a continuation-in-part of application Ser. No. 601,481, filed Apr. 18, 1984; and said application Ser. No. 601,481 is a continuation-in-part of original application Ser. No. 570,590, filed Jan. 13, 1984.

BACKGROUND OF THE INVENTION

The invention relates to hydraulic lift mechanism and in particular to such mechanism as is required to serve intermittent alternating vertical displacement of a load, wherein the load may be of various magnitudes within the capacity of the mechanism. Such conditions exist for hydraulically operated cranes and hoists, and the present invention is particularly concerned with clamshell devices as the means of picking up and discharging a loading of a crane or hoist.

Clamshell load-handling devices are of various configurations but are of a nature to require two cable suspensions—(a) for carrying the load, i.e., the clamshell device plus such load as it may contain and (b) for determining shell-opening and/or closing action of the device. The two cables are run from separate winches, with associated brakes and clutches, and relatively great operator skill is required in the selective sequential, concurrent and directional control of the winches and their cables, in order to perform the lift, drop and dig functions expected of the clamshell device.

Conventional cranes and hoists employ a prime mover such as a diesel engine or one of various types of electric motor, depending upon the design capacity of the involved lift system, and the rated power of the prime mover is conservatively selected for assured handling of the maximum rated load of the system. In most cases, the system further requires a gearbox, a speed reducer, a pulling drum (or winch) and a safety brake. Illustratively, for example, a crane with a 1-ton lift capacity (at one meter/second) requires a prime mover of 15 horsepower, and a crane with 10-ton lift capacity (at the same one meter/second) requires a prime mover of 150 horsepower. These requirements are not reduced when a clamshell device must be an operational component of the crane or hoist system.

BRIEF STATEMENT OF THE INVENTION

It is an object of the invention to provide improved mechanism for operation of a clamshell device of the character indicated.

It is a specific object to provide hydraulic means to achieve the above object.

It is a further specific object to achieve the above objects with great economy of prime-mover power, for a given system-load capacity.

It is also a specific object to achieve the above objects with greatly simplified and precise control of lift, load and drop functions.

A general object is to meet the above objects with simplified structure, at reduced overall expense, and inherently characterized by materially reduced operating cost.

The invention in a preferred embodiment achieves the foregoing objects with hydraulic-lift or crane mechanism which employs what I term a power integrator in each separate connection between a charged hydraulic accumulator and a different one of two hydraulic actuators for the respective suspension cables associated with the clamshell device via which the crane handles its load; each power integrator is independently reversibly controllable, but their functioning can be coordinated, to enable all dig, close, lift, dump and drop functions under a single manual control. Each power integrator has a prime-mover connection, and the pressurized charge of the accumulator is advisedly set to fully accommodate a preselected level of average load upon the two actuators.

More specifically as to the clamshell suspension, a first one of the hydraulically actuated cables provides the clamshell-"closing" connection, and the other hydraulically actuated cable provides the clamshell-"holding" connection. Pressure-responsive control componentry temporarily vents the "holding-line" actuator so that the "closing-line" actuator can cause the clamshell device to dig into loadable material (such as a pile of grain, sand, gravel or coal) until the clamshell has closed in its grasp on a load, whereupon the vent is closed and both actuators (via the accumulator and respective integrators) share in lifting the loaded clamshell. A simple operation of the "closing-line" actuator (to the exclusion of the "holding-line" actuator) releases the load and automatically opens the clamshell; and a biased check valve between the two actuators assures maintenance of the clamshell-open condition during a controlled drop, governed by the holding-line integrator.

Further specifically, the hydraulic circuit which supplies the two cable actuators and their pressure-responsive control componentry includes check valves, with a first pilot-operated check valve interposed between each power integrator and the accumulator and another pilot-operated check valve interposed between the power integrator and the associated cable actuator. The pilot-operated check valves cooperate with other check valves to assure automatic transfer of hydraulic fluid under pressure from the accumulator to each load actuator, and vice versa, as may be determined by selected control of or via the respective power integrators. The system of check valves also cooperates with pump action associated with rotation of each power integrator, to assure that adequate fluid is drawn from a sump and is deliverable for pilot-operated functions; stated in other words, with minimum reliance upon the sump, the system provides maximum conservation of energy in effecting such transfer of pressurized hydraulic fluid, from and to the accumulator, as may be involved in any controlled lift or descent of any load, within the capacity of the system.

A power integrator, as contemplated herein, is a rotary liquid-displacement device having two spaced flow-connection ports and an interposed rotor with externally accessible shaft connection to the rotor, and the expression "rotary" as used herein in connection with such a device is to be understood as including various known rotary-pump structures, such as gear-pump and sliding-vane devices, as well as axially reciprocating and radially reciprocating configurations, wherein rotor-shaft rotation is related to hydraulic flow into one port and out the other port. In other words, for purposes of the invention, such "rotary" devices provide for such hydraulic flow, and they provide for an external input/output torque-responsive relation to the hydraulic flow.

DETAILED DESCRIPTION

The invention will be illustratively described in connection with the accompanying drawing, which is a hydraulic-circuit diagram schematically illustrating a crane or the like hoist wherein a clamshell device is suspended and actuated via hydraulically actuated cables.

In the drawing, the invention is illustratively shown in application to a crane or hoist system having a boom 10 from the upper end of which a clamshell device 11 is suspended, via a so-called "closing" line or cable 12 and via a so-called "holding" line or cable 13. A "closing-line" actuator in the form of a first traction cylinder 14 is mounted to a lower region of boom 10, with the rod 15 of its piston extending upward and carrying sheave(s) 16 at its upper end. Rod (15) displacement is multiplied by tethering one end of the closing cable 12 to a bail or other fastening 17 and by reeving cable 12 over rod sheave(s) 16 and boom-mounted suspension at sheave(s) 18, the suspended end of cable 12 being terminated at a block 19 at the hinge connection of the buckets of clamshell device 11. A second traction cylinder 20 is also mounted to a lower region of boom 10, with the rod 21 of its piston extending upward and carrying sheave(s) 22 at its upper end. Rod (21) displacement is multipled by tethering one end of the secondary cable 13 to a bail or other fastening 23 and by reeving cable 13 over rod sheave(s) 22 and boom-mounted suspension at sheave(s) 24, the suspended end of cable 13 being terminated at a "holding" connection 25 of the clamshell device 11.

The clamshell device 11 is schematically shown to comprise half-shell or bucket formations 26-26' which are hinge-connected at the closing-line block 19, and corner-bar connections 28-28' link the holding-line connection 25 to the upper/outer corners of the respective bucket formations 26-26'. Thus, any pay-out of closing line 12 from a lifted and closed condition of the clamshell device will allow the buckets 26-26' to open as their hinge point 19 drops.

In the hydraulic arrangement shown, a charged hydraulic accumulator 30 is employed as a "counterweight", continuously operative (in lifting and lifted conditions of the clamshell device) upon fluid to lines 31 and 32 to effectively balance the dead load of the clamshell device 11, plus a predetermined live-load magnitude which is selected to be intermediate zero live load and full-rated live load, and generally one half the full-rated live load. A line 33 for hydraulic flow to or from accumulator 30 is connected at point 34 in parallel to separate "closing-line" and "holding-line" circuits which directly control flow in and out of the respective "closing-line" and "holding-line" actuators 14-20.

More specifically, in the case of the closing-line cylinder 14, pilot-operated check valves 35-36 are oriented to check hydraulic flow from accumulator 30 on the one hand and from cylinder 14 on the other hand, in the absence of a pilot-operated opening of one or the other of these valves (35-36); and a power integrator 37 is interposed between lines 35'-36' served by the respective check valves 35-36. The power integrator 37 is a rotary-displacement device having first and second flow-connection ports 38-39 to which lines 35'-36' are respectively connected, and an interposed rotor has externally accessible shaft connection to a prime mover such as a unidirectional electric motor or a diesel engine 40; detailed descriptions of suitable power integrators are provided in said applications Ser. No. 570,590 and Ser. No. 601,481, and therefore need not be repeated now. As shown in FIG. 1 (see arrow 41), the power integrator 37 is desirably a variable flow device, wherein variation in flow may be a positional function of a manual control stick. For example, at a vertically upright central position of control stick 41 (designated N, meaning neutral), the integrator rotor will continue to rotate, being driven by motor 40, but there will be no flow in either direction between ports 38-39; with clockwise displacement of stick 41, there will be flow from port 38 to port 39, and with counterclockwise displacement of stick 41, there will be flow in the opposite direction, from port 39 to port 38.

It is preferred that pilot opening of the respective check valves 35-36 shall be in response to a single actuating pressure. Thus, a line 42 establishes parallel connection of the respective pilots of check valves 35-36, and the circumstance of sufficient hydraulic pressure in a control line 43 is operative to dislodge both check valves 35-36 from their normally closed condition. This line-43 control connection additionally includes a solenoid-operated valve 44 which is normally positioned to discharge pressure fluid in line 43 to sump 45* but which is actuated by limitswitch means (not shown) whenever control stick 41 is shifted, either way, out of its central, neutral position; when thus actuated, valve 44 enables pressure fluid in either of the integrator-port lines 38-39 (35'-36') to pass via line 43 for concurrent pilot-driven opening of both check valves 35-36, there being isolation check valves 46-47 (connected back to back at 48 to valve 44) to assure integrity of the described pilot-operating connection 43. Upon de-activation of valve 44, pilot-operated valves 35/36 close, to shut down hydraulic operation, and all lines remain filled with hydraulic fluid in readiness for the next hydraulic operation.

*All schematic sump showings in the drawing will be understood to be interconnected or to be parts of the same collecting reservoir and are therefore given the same reference number 45, except that the base sump 45' for accumulation of fluid from all sump collections is distinguished by primed notation.

Two further check valves 49-50 in separate lines of connection from sump 45 to the respective port connections 38-39 of the power integrator 37, are operative to assure an initial supply of hydraulic fluid to the power integrator, upon initiating drive of a low-capacity sump pump 51, as via coupling (not shown) to motor 40; specifically, each of the check valves 49-50 is oriented to check or block any flow in the direction of sump 45'.

What has been described at items 35 to 50 in connection with control of flow between accumulator 30 and the "closing-line" actuator 14 is equally applicable to identical components which independently serve control of flow between accumulator 30 and the "holding-line" actuator 20; corresponding parts are therefore given the same identifying numbers in the "100" series, namely, reference numerals 135 to 150, respectively.

In accordance with a feature of the invention, certain interconnecting control connections are provided between the two described control circuits (35 to 50, and 135 to 150). Thus a control-line connection 55 enables instantaneously sensed "closing-line" actuator pressure (in line 36') to determine the operative condition of a two-position pressure-operated venting valve 56; in the position shown, valve 56 blocks any venting of hydraulic fluid from the "holding-line" actuator 20 because "closing-line" actuating pressure in line 36' is above a predetermined minimum or threshold (to be further discussed below), but when pressure in line 36' is below this threshold, valve 56 is shifted (by spring bias) to vent the "holding-line" actuator 20 to sump 45. In a second interconnection line 57, another pressure-operated two-position valve 58 determines whether "closing-line" fluid in line 36' shall be additionally channeled to the corresponding line 136', on the "holding-line" side of the system; for "closing-line" actuating pressure (in line 36') less than a predetermined minimum or threshold (which may be substantially the same as but slightly greater than the threshold in connection with valve 56), valve 58 will be in its blocking position, but for line 36' pressure above threshold, valve 58 is shifted to its open position (as shown), allowing "closing-line" actuating fluid to additionally flow in "holding-line" connections 136'–32 to the "holding-line" actuator. Finally, a biased check valve 60 in a third interconnection line 61 assures hydraulic flow from the "holding-line" actuator 20 (via lines 32-136') to the "closing-line" actuator 14 whenever "holding-line" actuator pressure exceeds "closing-line" actuator pressure by an amount which is predetermined to guarantee maintenance of a "buckets-open" condition of the clamshell device 11 during a drop, as just after dumped discharge of a clamshell-delivered load.

A brief operating description may now be given for the described circuit, which is to be understood as an illustration of a mode of use involving variable-flow power integrators (37–137), each of which has a control stick (41–141) for selecting flow direction and magnitude, in conjunction with a continuously running, unidirectional prime mover, which may be a single diesel engine serving both integrators 37–137.

Initially, one may assume a filled system wherein the pistons of cylinders 14–20 are locked at a particular level of suspension of clamshell device 11, by reason of load-induced pressure in lines 31–32 forcing closure of check valves 36–136, by reason of de-energizing the solenoid valves 44–144, thereby relieving the pilot-operating pressures at 43–143; and it will be understood that a charge of pressurized gas (e.g., nitrogen) will have been supplied (as via a commercial container 65 and suitable throttle and check valves 66–67) to the upper end of accumulator 30 over an adequate volume of hydraulic fluid, the gas pressure being retained by check valve 67 and the hydraulic outlet 33 of the accumulator being blocked and held, by forced closure of check valves 35–135. Hydraulic fluid lost to sumps and returned to the base sump or reservoir 45' will have been restored to accumulator 30 by the operation of a pump 68 driven by a motor 69 in response to bi-level sensing of hydraulic fluid in sump 45', a bi-level sensitive switch 70 being shown for the purpose, controlling excitation of motor 69 for a sensed upper level at 45', and controlling disconnection of motor 69 for a sensed lower level at 45'. A check valve 71 in the delivery line to the accumulator assures flow only in the direction to restore hydraulic fluid to the accumulator.

As noted above, pressure in the accumulator 30 will have been selected to enable counterweighting of an average load of clamshell 11, and the liquid volumetric capacity of the accumulator is such as to enable at least full displacement of the traction cylinders, without material change of accumulator pressure. Full accumulator pressure is thus applied against check valves 35–135 at all times, and the load-reflecting ram (traction-cylinder) pressure against check valves 36–136 may or may not be the same; in a lifted-load condition, ram pressure against check valves 36–136 will be slightly greater than accumulator pressure if the weight of the loaded clamshell 11 happens to be greater than the preselected "average", and ram pressure against check valves 36–136 will be slightly less than accumulator pressure if loaded-clamshell weight happens to be less than "average". By contrast, pressure on the other sides (35'–135', and 36'–136') of check valves 35–135 (36–136) will have been relieved, first, by the normal (i.e., unactuated) state of valve 44 wherein pilot-operating pressure in line 42 is vented to sump; secondly, unavoidable minor leakage, as at a shaft seal of one of the integrators 37–137 (e.g., to sump via a drain connection, not shown) will have relieved pilot-actuating pressures in lines 35'–135' (36'–136').

Let it be assumed that clamshell 11 has been dropped, buckets open, onto a pile of material to be picked up and deposited elsewhere within range of the crane, of which boom 10 is a part; and let it be further assumed that the crane has been shut down in this condition. All of the pilot-operated check valves 35–36 (135–136) will be closed, and "closing-line" hydraulic pressure at 36' will be lower than thresholds, so that valve 56 will be in its "vent" position, foreclosing "holding-line" actuation, and so that valve 58 will be in its blocking position.

The operator should start his prime-mover drive of the respective integrator rotors at 37–137, making sure that the control sticks 41–141 are in neutral (e.g., upright) position. Such rotation activates the low-volume pumps 51–151 for delivery of hydraulic fluid into lines 35'–36' (135'–136'). An increment of hydraulic fluid is immediately drawn from the sump base (reservoir) 45'; such action is brief and the drawn increments are small because lines 35'–36'–135'–136' were already full, so that the drawn increments quickly build pilot-operating pressure via one or both of lines 35–135' or 36'–136'; the onset of pilot-operating pressure is operative first to pressurize fluid through the applicable one of check valves 46–146 (47–147); and when the operator moves either one of the control sticks 41(141) out of neutral position, to thereby actuate the solenoids of valves 44–144, pilot-operating pressure fluid passes via lines 43 (143) for opening all pilot-operated check valves 35-36-135-136. Once check valves 35–135 have been actuated to open condition, accumulator (30) pressure is present in lines 35'–135' and is effective to maintain the open condition of all pilot-operated check valves 35-36-135-136; these check valves remain open until shut down, by limit-switch deactivation of the solenoids of valves 44–144, for venting the pilot-operating lines 43–143 when the respective control sticks 41/144 are returned to neutral position.

To dig into and lift a load from the pile of material which is to be picked up, the operator need only move the "closing-line" control stick 41 in the "lift" direction (e.g., clockwise), so that integrator 37 will permit flow (at accumulator pressure) from port 38 to port 39, for immediate actuation of the closing-line cylinder 14, to the exclusion of the holding-line cylinder 20. The buckets 26–26' are caused to dig into the pile because the vented (at 56) condition of cylinder 20 allows the full weight of the clamshell device 11 to bear on and sink into the pile, in the course of bucket-closing action. Once the buckets have closed, full accumulator pressure can be delivered to cylinder 14 (without changing the "lift" setting of the control stick 41). The clamshell will have closed upon the load it has grasped well before full accumulator pressure develops in cylinder 14, and the threshold pressures for first shifting valve 56 and for then shifting valve 58 are selected to be intermediate (a) the maximum pressure required to close upon toughly resistant material to be grasped and (b) a pressure well below the desired lifting limit of the "closing-line" system (14-12) alone. This being the case, the closing-line actuator 14 may alone begin to lift the clamshell and its grasped load, but in the course of this beginning of a lift, mounting pressure in line 36' will first traverse the threshold of valve 56 operating and then the threshold of valve 58 operation. As a result, pressure fluid flow metered by closing-line integrator 37 is branched into the "holding-line" connections 136'-32 to cylinder 20, and both cylinders 14-20 function, with both cables 12-13 cooperating to share in lifting the loaded clamshell. In the course of this lifting, the operator may optionally shift the "holding-line" control stick 141 to a lift-mode position, in which case, both integrators (37-137) can also share in the provision of hydraulic flows, essentially doubling that available from integrator 37 alone, thus speeding up the load-lifting phase of operation.

When the operator judges that the loaded clamshell has lifted to maximum desired elevation, and when he has otherwise maneuvered the crane or its boom 10 to place the clamshell over a load-dumping site, he should assure against further lifting by placing both control sticks 41-141 in neutral (e.g., upright) position, and he can open the clamshell to release the load merely by actuating the "closing-line" stick 41 to a descent position (e.g., counterclockwise from the neutral position). This allows immediate payout of cable 12 due to the weight and gravitational fall of the block 19 at which both buckets 26-26' pivot. The crane or boom 10 is then repositioned for the next load pick up, and the clamshell (with buckets open) is caused to descend, and if desired virtually fall, into the pile of material, merely by shifting the holding-line control stick 141 to a descent position (e.g., counterclockwise from its neutral position). In the course of such descent, the loaded check valve 60 assures such predetermined differential between pressures in lines 136' and 36' that (a) the buckets 26-26' remain open throughout clamshell descent and (b) there is such load sharing during the descent that slack develops in neither of the cables 12-13.

The descent phase of operation may proceed as rapidly as desired, in accordance with the descent setting of control stick 141 (counterclockwise of the neutral position), and it is not necessary to call for any particular deceleration prior to impact with the pile from which the next clamshell load is to be dug. The clamshell may therefore hit the pile at full speed, in jaws-open condition, for optimum bite into the pile. Once having sunk into the pile, however, the weight of the empty clamshell 11 is no longer loading the holding-line actuator 20, so that pressure quickly drops to substantially zero in line 32 (136') to one integrator port 139, while full accumulator pressure remains at the other accumulator port 138. This great pressure difference across the holding-line integrator 137 (while in a descent-control position of its control stick 141) can be destructive of the integrator as long as its control is set for the descent condition, i.e., unless control stick 141 is quickly returned to its neutral setting. In the form shown, a valve 72 is responsive to such a drop in pressure in line 32 (136') and is operative to supply full accumulator pressure (from line 135') to actuators 73 and 173 for immediately bringing control sticks 41 and 141 to their respective neutral positions. Such automatic devices 72-73-173 will remain in actuated position, preventing controlstick actuation into a descent-control position, unless and until pressure is again present in line 32 (136'), which will of course be the case soon after the operator resets the control stick 41 for the next lifting cycle, i.e., after the clamshell has closed on its newly gathered load and valve 58 has been actuated to transfer lifting pressure fluid from line 36' to line 136'.

It will be seen that the described system meets all stated objectives. Although it has been described for the case of manual control, the system lends itself to full automation, even as the height of a pile decreases with successive removal of clamshell loads, in that the system always automatically senses "bottom" position, with return of control systems to neutral. All that is needed to commence the next dig for a clamshell load is to shift the single closing-line control 41 to a lift (clockwise) position; all that is needed to dump an elevated load is to shift the same single closing-line control 41 to a descent (counterclockwise) position; and all that is then needed to initate an automatic descent to, and only to, the "bottom" is to shift the holding-line control stick to a descent position (counterclockwise of neutral). It is a simple matter for the operator to shift the holding-line control to a lift (clockwise) position once he sees that the clamshell is closed or that clamshell lifting has begun, but it will be understood to be simple to automate this holding-line control shift, as via a hydraulic actuator (similar to actuator 73), which shifts stick 141 from neutral to a lift position when a differential-pressure responsive valve (not shown) detects resumed substantial equality of hydraulic pressures in lines 135' and 135', pressure fluid in line 136' being relied upon as the actuator fluid.

Advantages of the described system appear, at least in part, in the following tabulation:
1. The system is easy to retrofit to existing cranes and their clamshell devices.
2. The system is inherently inexpensive, to manufacture, to install, to use and to maintain, all as compared to prior machines and techniques.
3. The installed power needed for a given loadhandling capability is substantially reduced, to about one third of what is needed for prior machines of equivalent capacity.
4. The system replaces and eliminates need for the following components of prior machines:
torque converter
gear box
drums (winches)
clutches
brakes
pneumatic controls
hoisting controls.
5. The system is inherently more safe than prior systems.
6. The system has no rotational inertias, and thus is characterized by inherently faster response to a given control.
7. The system enables use of smaller cables because both cables 12-13 share the load.
8. The system is of less weight than the prior system it replaces.

9. Reduced maintenance characterizes the new system, from having eliminated the above-listed components of prior systems, e.g., there are no greasing points.
10. Fuel consumption is reduced, to approximately 25 percent of prior requirements, by reason of the reduction in installed power and by reason of shorter, more efficient working cycles.
11. The system operates with materially reduced shock loads on the structure.
12. A retrofit to accommodate the new system can leave existing winches in place, for stevedoring operations.
13. The new system features extreme ease of operation, with at most two control sticks (levers), or it may be fully automatic, all as compared to the seven controls of prior systems and the concomitant need for their highly skilled manual coordination.
14. The system features no slack in either of the cables.
15. The system is automatic in its sensing of and accommodation to the "bottom" and is thus of particularly important use in underwater dredging.

While the invention has been described in detail, it will be understood that modifications may be made without departing from the scope of the invention. For example, electric control-circuit connections (not shown) may implement or replace various of the hydraulically operated controls that have been shown and described.

Some of the above-advantages may be more readily appreciated from a brief comparison of physical quantities and parameters applicable to an illustrative crane or derrick of, say, 30-ton capacity, wherein the clamshell device 11 weighs 30,000 lbs. and an average grasped load in the clamshell is 22,000 lbs., and wherein the load-lifting stroke is 90 feet. The actuating cylinders 14-20 may be identical, of nine inch bore (with 2.5 in. diameter rod) and 24-ft. stroke. For a 1:4 reeving (22-24) of the holding line 13, this translates to a 96-ft. length for line 13. But for a clamshell 11 of the indicated size, further reeving is required for the end of closing line 12 (between sheaves at blocks 19-25, as shown in commercial literature of Anvil Industries, Inc., Brechsville, Ohio, for their Owen, Type M. General Purpose Buckets), so that an additional 40-ft. length is needed to accomplish full closing displacement of the clamshell buckets; the closing-line requirement is therefore for 140 feet of cable, which translates into a 1:6 reeving (16-18) of the closing line 12. Thus, with the indicated different reevings for the closing line 12 and for the holding line 13, the same full 24-ft. stroke at both cylinders accommodates the different lengths and functions of the respective cables 12-13. And for this illustrative case, the sharing of lifting load is in the proportion 60:40.

Since my new system relies on load sharing, the cable size can be reduced to 1-in. diameter, as compared to the 1.5-in. diameter cable considered necessary in prior systems of like capacity.*

By way of further illustration, for a 60-ton clamshell crane the corresponding cable-size reduction is to 1⅜-in. diameter, from a 2-in. diameter which would otherwise be required.

In the illustrative 30-ton clamshell crane, prime-mover power may be provided by a single engine or motor (suitably 200 horsepower) serving at 40 and 140 for both power integrators (37-137); and this is to be compared with the 600 horsepower for a prior system of equivalent capacity. Lift speed of 210 feet/min. can be maintained for virtually the entire lifting stroke of the crane, because acceleration/deceleration phases are short and smoothly accomplished in the preferred employment of swash-plate adjustment in a power-integrator configuration which adopts conventional axial-piston pump/motor design. All working strokes are necessarily of shorter duration than in machines of prior configuration, because clutching/braking operations are not involved.

What is claimed is:

1. In a cable-suspended hydraulically actuated lift system wherein a clamshell or the like device having separate holding-line and closing-line connections is to be lifted and/or actuated by separate cables respectively coupled to said holding-line and to said closing-line connections, the improvement wherein first and second hydraulic-lift actuators are mounted in tandem for independent actuation of the respective cables, pressurized hydraulic-accumulator means independently connected to said hydraulic-lift actuators in the direction to provide lifting force via each of said actuators, a separate reversibly controllable rotary hydraulic power integrator in each of said accumulator connections to said hydraulic-lift actuators, whereby a closing-line actuator connection connects a closing-line integrator to the closing-line actuator and a holding-line actuator connection connects a holding-line integrator to the holding-line actuator; a first load-sharing hydraulic connection including first threshold-operated check-valve means connecting and providing flow from said closing-line actuator connection to said holding-line actuator connection only for closing-line actuator pressure of at least a predetermined threshold level, pressure-operated valve means responding to instantaneous closing-line actuator pressure and relieving hydraulic fluid to sump from said holding-line actuator only for closing-line actuator pressures below said predetermined threshold level, whereby at commencement of a lifting operation said closing-line actuator alone will be operative until the clamshell is closed and further whereby both actuators can share a lifting load upon achievement of said predetermined threshold level in a lifting-control operation of said closing-line integrator; further whereby, once both actuators have commenced sharing the lifting load, the holding-line integrator may be shifted to its lifting-control condition, in aid of the lifting-control condition of the closing-line integrator; and still further whereby, at a desired lifted elevation of the load, the load may be dumped by clamshell opening, upon shifting the closing-line integrator to its descent-control condition.

2. The improvement of claim 1, further including second threshold-operated check-valve means connecting and providing flow from said holding-line actuator connection to said closing-line actuator connection only for holding-line actuator pressure of a second predetermined threshold level with respect to instantaneous closing-line actuating pressure, whereby both actuators can share the load of an open clamshell as to assure the clamshell-open condition throughout a descent-control operation of said holding-line integrator.

3. The system of claim 1, in which said accumulator means serves both power integrators in parallel.

4. The system of claim 1, in which first reeving independently connects the first actuator to the holding-line connection at a first multiplying ratio, and second reeving independently connects the second actuator to the holding-line connection at a second multiplying ratio.

5. The system of claim 4, in which first and second reevings are so proportioned that more than half the full load assumed by the system is assumed by the holding line.

6. The system of claim 4, in which said actuators are characterized by substantially equal strokes, and in which the reeving for the closing line is characterized by a greater cable-displacement ratio than that of the reeving for the holding line, whereby in a single lifting stroke both actuators may be used for their full strokes and excess cable displacement is available for clamshell closing prior to lifting.

7. The system of claim 1, in which each of said power integrators is actuable to a neutral condition between its lifting-control condition and its descent-control condition, and in which shifting means is responsive to a predetermined drop in pressure in the holding-line actuator connection to the holding-line integrator, said shifting means being operatively connected to shift the holding-line integrator to its neutral condition upon occurrence of said drop in pressure.

* * * * *